UNITED STATES PATENT OFFICE.

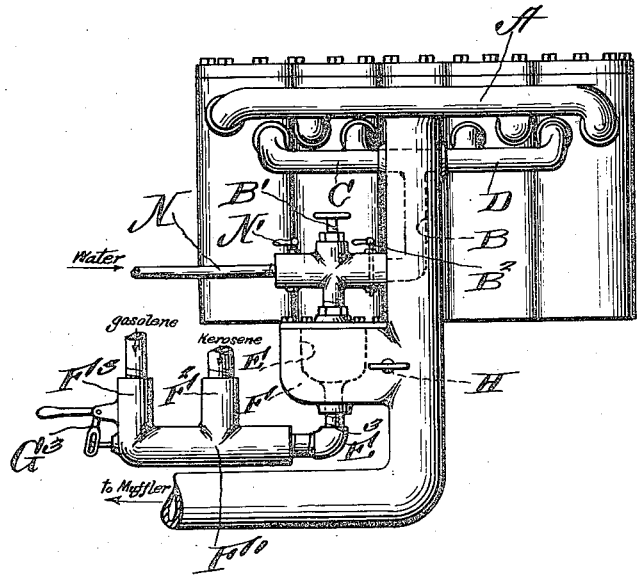
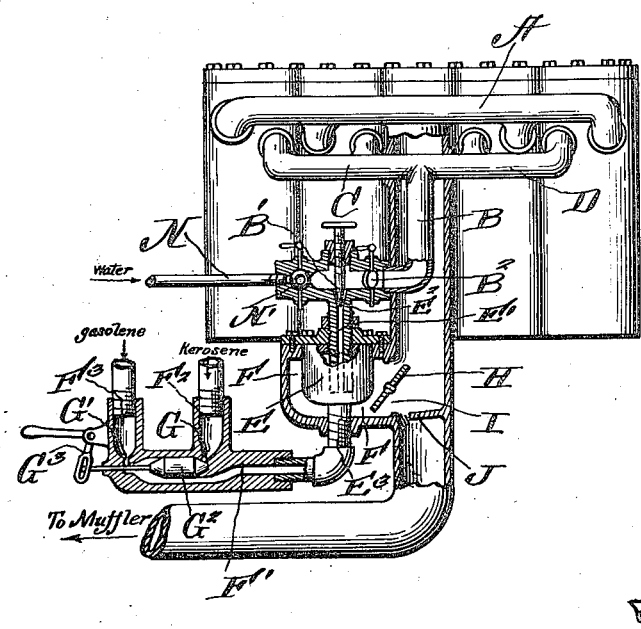

EARL MARCUS BRUNER AND EMIL J. OTTO, OF MITCHELL, NEBRASKA.

EXHAUST AND INTAKE MANIFOLD FOR CARBURETERS FOR BURNING HEAVY OILS.

1,296,313.  Specification of Letters Patent.  Patented Mar. 4, 1919.

Application filed December 15, 1917. Serial No. 207,354.

*To all whom it may concern:*

Be it known that we, EARL M. BRUNER and EMIL J. OTTO, citizens of the United States, residing at Mitchell, in the county of Scotts Bluff and State of Nebraska, have invented certain new and useful Improvements in Exhaust and Intake Manifolds for Carbureters for Burning Heavy Oils; and we do hereby declare the following to be a full, clear, and exact description of the invention, such as will enable others skilled in the art to which it appertains to make and use the same, reference being had to the accompanying drawings, and to the letters and figures of reference marked thereon, which form part of this specification.

This invention relates to new and useful improvements in exhaust and intake manifolds for use in connection with a Holley type of carbureter upon Ford engines, and consists of a simple and efficient device whereby the float chamber may be heated by exhaust from the engine, for the purpose of heating the fuel and assisting in vaporizing kerosene.

The present invention consists of a simple and efficient device of this nature having various details of construction, combinations and arrangements of parts which will be hereinafter fully described, shown in the accompanying drawings and then specifically defined in the appended claim.

We illustrate our invention in the accompanying drawings which, with the letters of reference marked thereon, form a part of this specification and in which:

Figure 1 is a side elevation showing the application of our invention, and

Fig. 2 is a sectional view vertically through the attachment.

Reference now being had to the details of the drawings by letter:

A designates the exhaust manifold of the engine, and B an intake manifold having branching pipes C and D, which lead to the exhaust manifold in the manner shown in Fig. 1 of the drawings being of considerable length, in order to permit the mixture of fuel to be re-cooled slightly for proper combustion, after the temperature of which has been raised by heat from the exhaust. Mounted upon, and communicating with, the frame of the exhaust manifold is a float chamber E about which is a space F through which the exhaust from the manifold is adapted to circulate, for the purpose of heating the fuel within the fuel chamber.

A suitable valve H is pivotally mounted in the throat I of the passageway leading from the exhaust pipe into the space F about the float chamber E, and forms means for regulating the amount of exhaust to be admitted to said space, assisting in vaporizing the fuel therein. A deflecting member J projects horizontally from the wall of the exhaust pipe and tends to cause the exhaust to pass through the throat I when the valve H is open. The supply of gasolene is adapted to be fed through the pipe $F^3$ into the chamber $G'$, and thence into the interior of the casing $F'$, while kerosene enters through the pipe $F^2$ into the chamber G thence into the casing $F'$, its supply being regulated by the valve $G^2$ actuated by the lever $G^3$. The carbureter $E'$ fitted in the top of the float chamber with which it communicates has a needle valve $B'$ regulating the kerosene and fuel which is drawn through the opening $E^2$ into the intake pipe B the feeding of which into the intake pipe is regulated by the valve $B^2$, after commingling with water entering through the pipe N, and which water is regulated by the valve $N'$.

By the provision of an apparatus embodying the features of our invention a simple and efficient device is afforded which may be applied to an engine without the necessity of the installation of a new carbureter, new engine head, or other attachments usually required in kerosene carbureters, and through the medium of the means shown and described, the heat from the exhaust will serve to raise the temperature of the fuel within the float chamber, and which temperature may be regulated by the valve H permitting more or less heat from the exhaust to pass into the float chamber. The branching pipes leading from the intake to the manifold, are of such lengths as to permit the mixture to be re-cooled slightly, in order to produce proper combustion.

By the provision of our improved device over-heating of the engine will be eliminated, which is a common trouble met with in apparatus employed for burning hydro-carbon oils in connection with motors. Owing to the thorough vaporization of the fuel, the carbon formed in the engine is reduced to a minimum.

What we claim to be new is:

An attachment to engines for vaporizing heavy oils, comprising in combination with the exhaust and intake pipe of a manifold, a fuel float chamber, a carbureter communicating with the upper portion of said float chamber, a pipe leading from the carbureter and passing through the wall of the exhaust pipe from the manifold, a casing about said chamber, and a fuel supply pipe leading through the wall of the casing and communicating with the float chamber, the casing having an opening in one side communicating with the exhaust pipe, a valve regulating said opening, a baffle projecting laterally from the inner surface of the exhaust pipe with its free end terminating a slight distance from the bottom of said opening into the casing below said valve.

In testimony whereof we hereunto affix our signatures in presence of two witnesses.

EARL MARCUS BRUNER.
EMIL J. OTTO.

Witnesses:
O. P. BURROWS,
BURNEY WEARE.